US008581749B2

(12) United States Patent  (10) Patent No.: US 8,581,749 B2
Wohlert et al.  (45) Date of Patent: Nov. 12, 2013

(54) METHOD AND SYSTEM FOR PREDICTIVE HUMAN INTERFACE

(71) Applicant: AT&T Intellectual Property I, L.P., Atlanta, GA (US)

(72) Inventors: Randolph Wohlert, Austin, TX (US); James Pratt, Round Rock, TX (US); Marc Sullivan, Austin, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/744,964

(22) Filed: Jan. 18, 2013

(65) Prior Publication Data

US 2013/0132858 A1   May 23, 2013

Related U.S. Application Data

(63) Continuation of application No. 12/825,628, filed on Jun. 29, 2010, now Pat. No. 8,378,856.

(51) Int. Cl.
*G09G 5/00*   (2006.01)
(52) U.S. Cl.
USPC ............................................................ 341/20
(58) Field of Classification Search
USPC ..................................... 341/20; 715/716–729
See application file for complete search history.

(56) References Cited

U.S. PATENT DOCUMENTS

| 5,389,773 | A  |   | 2/1995  | Coutts et al. |
| 5,726,688 | A  |   | 3/1998  | Siefert et al. |
| 5,805,158 | A  |   | 9/1998  | Bertram et al. |
| 5,889,993 | A  |   | 3/1999  | Kroeger et al. |
| 5,920,477 | A  |   | 7/1999  | Hoffberg et al. |
| 5,963,910 | A  |   | 10/1999 | Ulwick |
| 6,150,962 | A  |   | 11/2000 | Rossmann |
| 6,223,059 | B1 |   | 4/2001  | Haestrup |
| 6,418,424 | B1 |   | 7/2002  | Hoffberg et al. |
| 6,947,935 | B1 |   | 9/2005  | Horvitz et al. |
| 6,954,758 | B1 |   | 10/2005 | O'Flaherty |
| 8,161,413 | B2 | * | 4/2012  | Chen et al. ..................... 715/854 |
| 2006/0122976 | A1 |   | 6/2006  | Baluja et al. |
| 2008/0162616 | A1 | * | 7/2008  | Gross et al. ................... 708/300 |
| 2011/0219254 | A1 |   | 9/2011  | Zatylny et al. |

\* cited by examiner

*Primary Examiner* — Khanh V Nguyen
(74) *Attorney, Agent, or Firm* — Greenblum & Bernstein, P.L.C.

(57) ABSTRACT

A method and system for providing a predictive human interface for a plurality of user electronic devices, which includes storing, in an electronic database, user preferences regarding how certain specified communications related to the user electronic devices are to be processed. The method and system also includes monitoring and storing, by a network server, specific characteristics associated with communications originating from the user electronic devices, generating a similar predictive human interface for each of the user electronic devices, based upon the stored user preferences and the stored specific characteristics for the user electronic devices, and providing the predictive human interface to each of the user electronic devices for use during communications originating from one of the user electronic devices.

20 Claims, 4 Drawing Sheets

METHOD AND SYSTEM FOR PREDICTIVE HUMAN INTERFACE

CROSS-REFERENCE TO RELATED APPLICATIONS

This application is a continuation of U.S. patent application Ser. No. 12/825,628, filed on Jun. 29, 2010, the disclosure of which is expressly incorporated herein by reference in its entirety.

FIELD OF DISCLOSURE

The present disclosure relates to the field of communications. More particularly, the present disclosure relates to providing a predictive human interface that is consistent across a wide variety of user electronic devices. The predictive human interface presents communication alternatives to the user that have been predicted based upon stored characteristics associated with the user's previous communications. Examples of applicable user electronic devices would include cell phones, wireline phones, desktop computers, laptop computers, netbooks, and internet protocol television receivers.

BACKGROUND INFORMATION

Traditionally, the human interface is different for each of a user's electronic devices. Additionally, each of the different human interfaces is normally provided in a fixed standardized format that does not change dependent upon how the electronic device is used.

DETAILED DESCRIPTION

Figure 1:
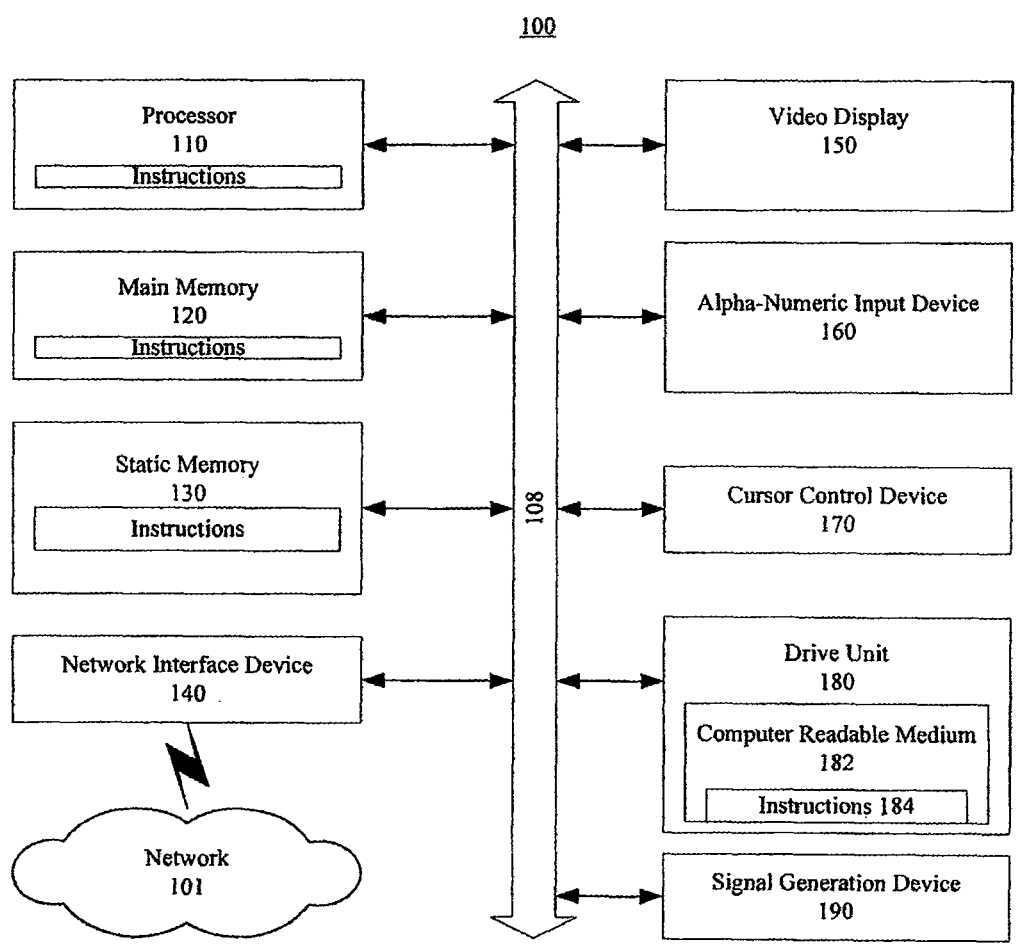
FIG. 1 shows an exemplary general computer system.

In view of the foregoing, the present disclosure, through one or more of its various aspects, embodiments and/or specific features or sub-components, is thus intended to bring out one or more of the advantages as specifically noted below. According to an embodiment of the present disclosure, a method provides a predictive human interface for a plurality of user electronic devices. The method establishes a user account with a service provider, registers the plurality of user electronic devices in an electronic database associated with the user account, and stores, in the electronic database, initial user preferences regarding how certain specified communications related to one or more of the plurality of user electronic devices are to be processed. The method also monitors and stores, by a core network server, specific characteristics associated with each communication originating from each of the plurality of user electronic devices. The method then generates a predictive human interface for the plurality of user electronic devices, based upon the stored specific characteristics for all of the plurality of user electronic devices. The method further provides the predictive human interface to the plurality of user electronic devices for use during a next communication originating from one of the plurality of user electronic devices.

In another embodiment, the specific characteristics include the date, time of day, and intended destination of each communication.

In a further embodiment, the specific characteristics include a location of a user electronic device when the user electronic device originates a communication.

In an embodiment, the plurality of user electronic devices that are acceptable to be registered for the predictive human interface include cell phones, wireline phones, desktop computers, laptop computers, netbooks, and internet protocol television receivers.

In another embodiment, the predictive human interface is regenerated, and the regenerated predictive human interface is provided to the plurality of user electronic devices after a communication originating from any one of the plurality of user electronic devices.

In a further embodiment, the predictive human interface is regenerated, and the regenerated predictive human interface is provided to the plurality of user electronic devices at designated time intervals.

In an embodiment, the predictive user interface provides a similar user interface on all of the plurality of user electronic devices, the similar user interface presenting communication alternatives to the user that have been predicted based upon the stored specific characteristics associated with the user's previous communications.

In another embodiment, the communication alternatives presented are prioritized according to the most probable user communication based upon a current date and time.

In a further embodiment, the communication alternatives presented are further prioritized according to the user's current location.

In an embodiment, the communication alternatives are visually presented to the user as icons, each visually presented icon providing a visual distinction when a person associated with the visually presented icon is currently on-line.

In another embodiment, the communication alternatives are visually presented to the user as icons, each visually presented icon providing specific information regarding an amount of time that has elapsed since a last communication with a person associated the visually presented icon.

In a further embodiment, the communication alternatives are visually presented to the user as icons, each visually presented icon providing specific information regarding a number of pending communications that have not been communicated to the user, from each person associated with each icon.

In an embodiment, the communication alternatives presented are further prioritized according to the stored user preferences regarding how certain specified communications are to be processed.

In another embodiment, the user may select one of the communication alternatives in order to initiate a new communication, a communication medium being automatically selected for the new communication based on an algorithm that evaluates the stored specific characteristics, the stored specific characteristics including the frequency of particular communication mediums being previously used to communicate with an intended recipient of the new communication.

In a further embodiment, the user may select one of the communication alternatives in order to initiate a new communication, a communication medium being automatically selected for the new communication based on an algorithm that evaluates the stored user preferences.

In an embodiment, the communication alternatives supported include initiating a call, browsing the internet, sending an email, initiating a conference call, sending a text message, watching internet protocol television, and sending an instant message.

In another embodiment, a non-transitory computer-readable storage medium, encoded with a computer-executable program, provides a predictive human interface for a plurality of user electronic devices. The computer-executable program includes an establishing segment for establishing a user account with a service provider, a registering segment for registering the plurality of user electronic devices in an electronic database associated with the user account, and a storing segment for storing, in the electronic database, initial user preferences regarding how certain specified communications related to one or more of the plurality of user electronic devices are to be processed. The computer-executable program also includes a monitoring and storing segment for monitoring and storing, by a core network server, specific characteristics associated with each communication originating from each of the plurality of user electronic devices. The computer-executable program further includes a generating segment for generating a predictive human interface for the plurality of user electronic devices, based upon the stored specific characteristics for all of the plurality of user electronic devices, and a providing segment for providing the predictive human interface to the plurality of user electronic devices for use during a next communication originating from one of the plurality of user electronic devices.

In a further embodiment, the predictive user interface provides a similar user interface on all of the plurality of user electronic devices, the similar user interface presenting communication alternatives to the user that have been predicted based upon the stored specific characteristics associated with the user's previous communications.

In an embodiment, a core network server provides a predictive human interface for a plurality of user electronic devices, in which the core network server includes a receiver for receiving an identification of each of the plurality of user electronic devices associated with a user account, and a memory including an electronic database for storing the identification of each of the received plurality of user electronic devices associated a user account. The core network server also includes a processor for monitoring and storing specific characteristics associated with each communication originating from each of the plurality of user electronic devices, and a generator for generating a predictive human interface for the plurality of user electronic devices, based upon the stored specific characteristics for all of the plurality of user electronic devices, The core network server further includes a transmitter for providing the predictive human interface to the plurality of user electronic devices for use during a next communication originating from one of the plurality of user electronic devices.

In another embodiment, the predictive user interface provides a similar user interface on all of the plurality of user electronic devices, the similar user interface presenting communication alternatives to the user that have been predicted based upon the stored specific characteristics associated with the user's previous communications.

FIG. 1 is an illustrative embodiment of a general computer system, on which a method for providing a predictive human interface for a plurality of user electronic devices can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
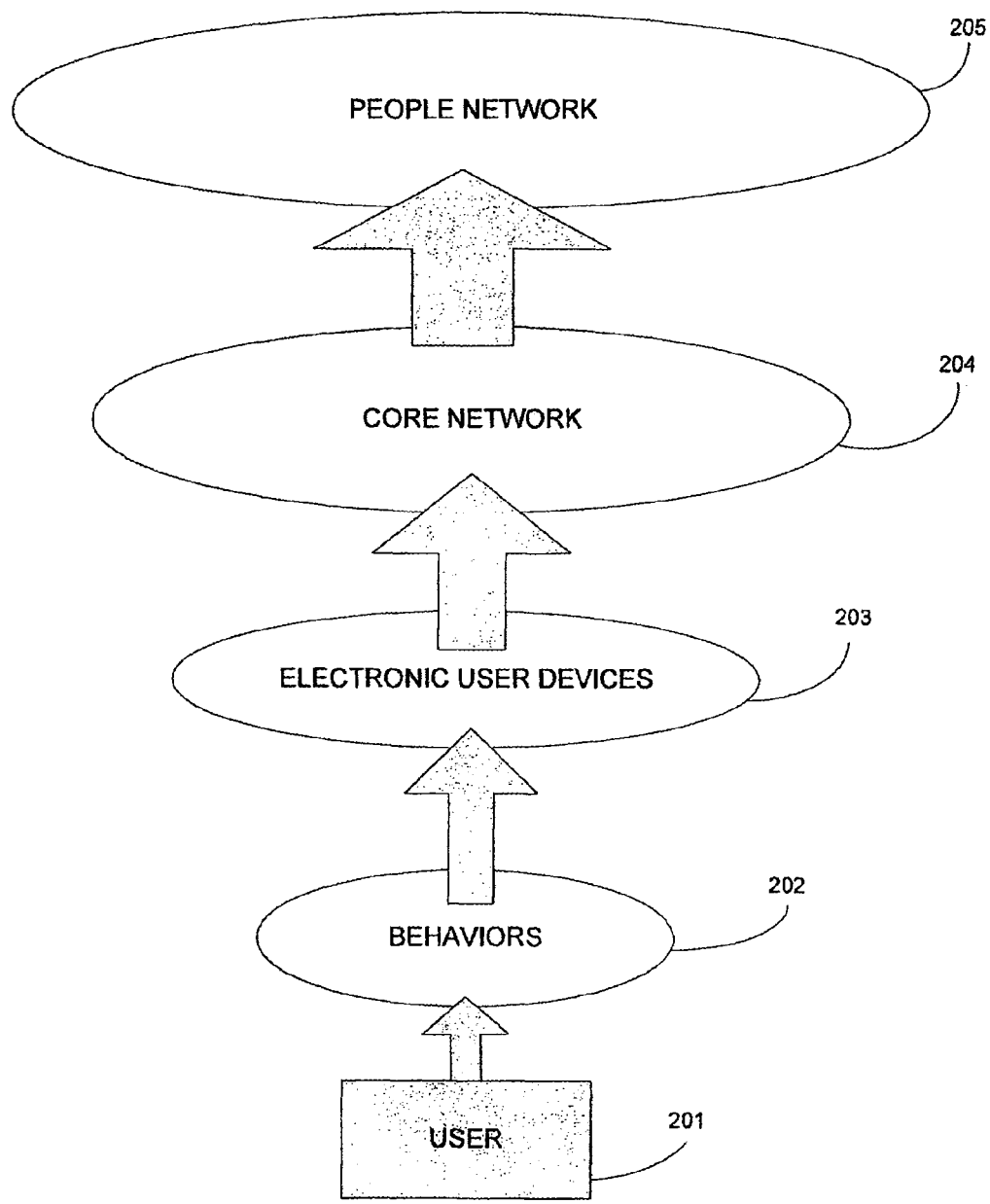
FIG. 2 shows an illustration of a user oriented layered approach to unified communications.

FIG. 2 shows an illustration of a user oriented layered approach to unified communications. In a user oriented layered approach, the various behaviors 202 of a user 201 utilizing a variety of electronic user devices 203 is constantly monitored by a core network 204. The user behaviors that are monitored include the various ways that the user 201 electronically communicates and shares information with other people included in the user's people network 205.

In performing these functions, the user 201 may interact with a variety of electronic user devices 203. Non-limiting examples of such electronic user devices 203 would include, but are not limited to, a cell phone, a land-line phone, a netbook, a personal computer, a home manager, an internet protocol television, a personal digital assistant, an electronic tablet, and an intelligent watch.

The electronic user devices 203 electronically interact with a core network 204, which also may include a variety of electronic network devices. Non-limiting examples of such electronic core network devices would include, but are not limited to, a variety of specialized servers. These servers process all forms of user communications, including video, voice, graphics, and text. Additionally, various processors would also manage information, such as user content material, maintain user presence information, and monitor buddy lists. Furthermore, a core network server would manage a core network address book, in order to provide an overall management of the user data associated with the core network.

People network 205 is inclusive of the various people with which a user electronically interacts. These people may be electronically engaged individually or collectively in designated groups. The people may be designated into various categories, such as people included in a social network category, a professional network category, an acquaintance category, a service provider category, and so on. These categories may not be mutually exclusive, but may overlap with regard to the individuals included therein.

Figure 3:
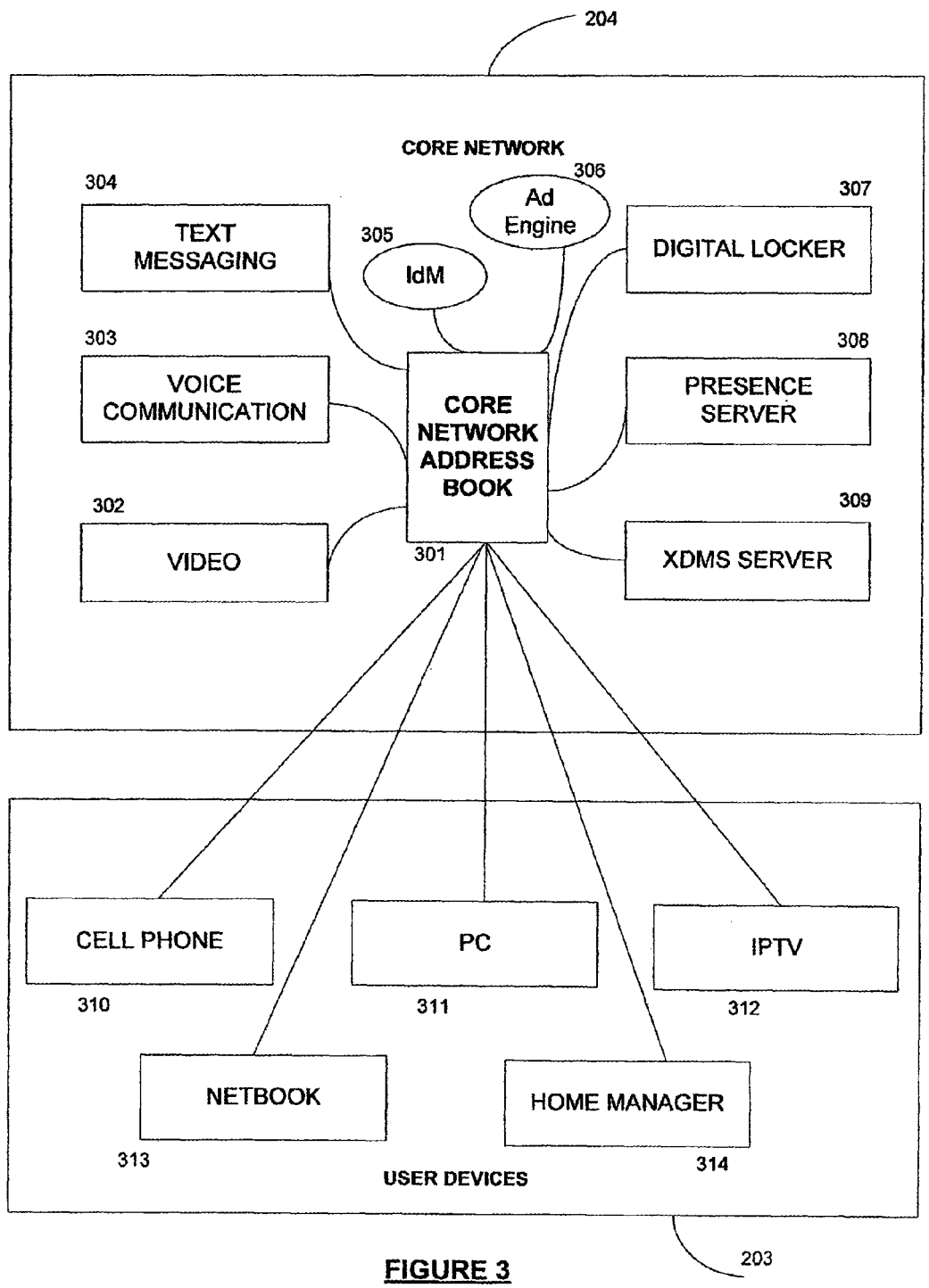
FIG. 3 shows an illustration of a system architecture conceptualization of the predictive human interface centralized in a core network address book.

FIG. 3 shows an illustration of a system architecture conceptualization of the predictive human interface managed by a core network address book 301. As previously discussed with regard to FIG. 2, a user may interact with a wide variety of electronic user devices 203. FIG. 3 graphically depicts some of the various electronic user devices 203 that a user may utilize, including a cell phone 310, a PC (personal computer) 311, an IPTV (internet protocol television) 312, a netbook 313, and a home manager 314.

All of the various user communications from the various user devices 203 are monitored by a core network 204, including a core server that manages a core network address book 301. The user communications monitored by the core network address book 301 may include video 302, voice, 303, and text messaging 304. Each of these forms of communications is inclusive of a wide variety of formats. For example, text messaging may include email, chat rooms, instant messaging, multimedia message services, and short message services. The core network address book 301 may also monitor a user's interaction with the internet for data gathering, such as with IdM and Ad Engine. Additionally, the core network address book 301 may also monitor how a user shares various information individually or collectively with other individuals include in the user's people network 205. This form of monitoring may include information shared via a digital locker, including music, video, graphics, documents, photos, and digital links to internet sites. Other shared information may include presence information maintained by a presence server 305, and document management information maintained by an XDMS server 309.

The core network 204 utilizing the core network address book 301 generates a predictive human interface that is consistent across all of the electronic user devices 203 that are used by a particular user 201. The predictive user interface presents communication alternatives to the user that have been predicted based upon stored characteristics associated with the user's previous communications using the electronic user devices 203. The communication alternatives presented to the user are prioritized in a manner so as to predict how the user would likely want to communicate to someone at a particular date, time, location, and/or mood. The methodology related to this interactive process is further described in relation to FIG. 4.

Figure 4:
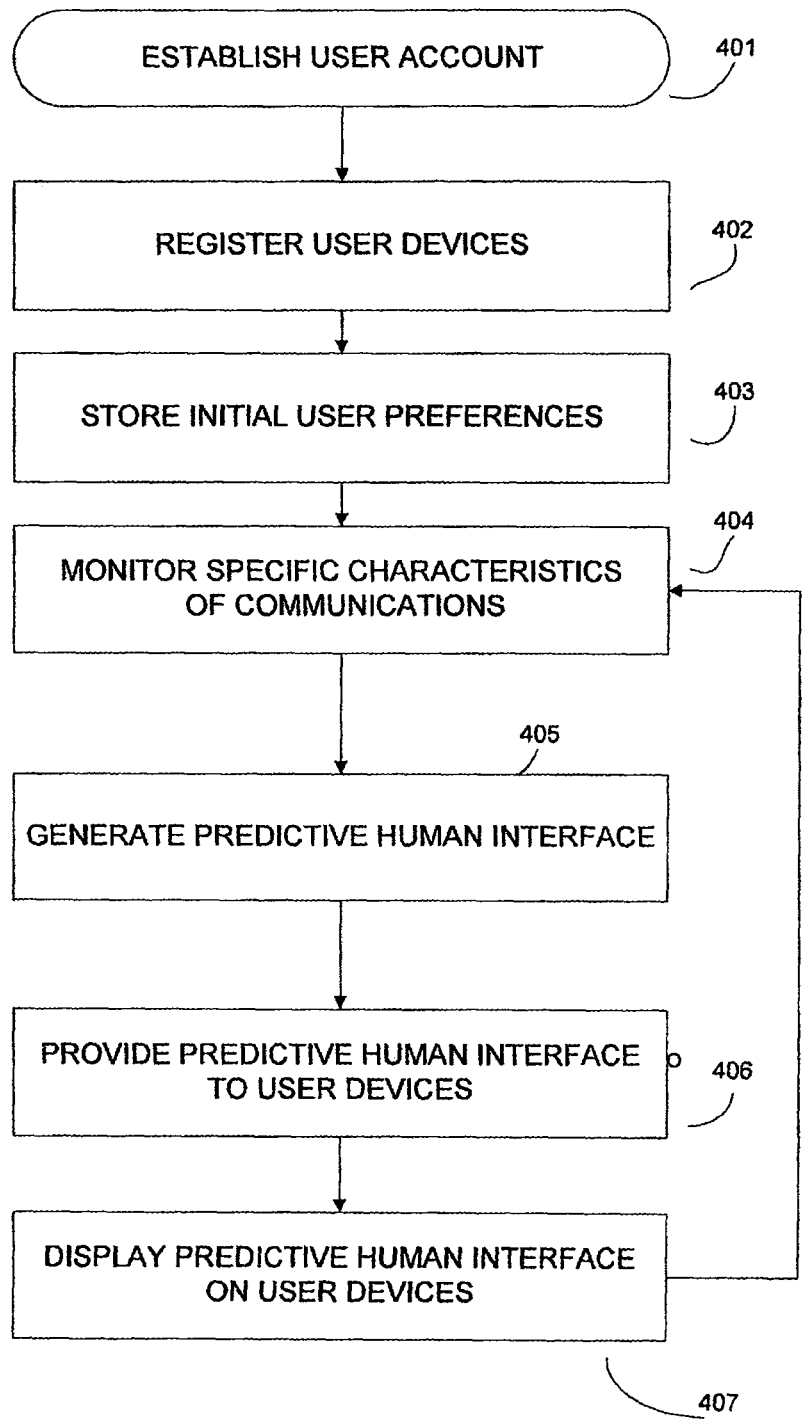
FIG. 4 is a flowchart depicting an exemplary predictive human interface process, according to an aspect of the present disclosure.

FIG. 4 shows a basic flowchart depicting an exemplary predictive human interface process, according to an aspect of the present disclosure. In the flowchart, the method starts when the user establishes a user account with a designated service provider 401. Establishing such an account may include many forms and would generally include the registration of various user devices 402 that are associated with the user account and that are to be monitored by the predictive human interface process. This registration may also be listed in an electronic database or a network core address book, accessible by a core network server. The method may also include the storing of initial user preferences 403 regarding how certain forms of communication are to be processed. For instance, the user may designate that certain calls are to be routed to an intended recipient's personal cell phone, landline home phone, or business phone dependent upon the day of the week, and/or the time of day. Additionally, the user preferences may also be based upon other factors, such as an intended recipient's location.

FIG. 4 also illustrates that the method for providing a predictive human interface for a plurality of user electronic devices includes the monitoring and storing of specific characteristics associated with each communication related to one or more of the various registered user electronic devices 404. The specific characteristics that are monitored may include the date, the time of day, and the intended destination or recipient of each of the user's communications. The specific characteristics may also include the location and type of the user's electronic device that is generating the electronic user communication. Additionally, the location of the communication recipient, the particular form of each communication, and the type of electronic device on which the communication recipient receives the communication, may be included in the specific characteristics that are monitored. A communication recipient's designated status, or mood, may also be included in the specific characteristics that are monitored.

The method as illustrated in FIG. 4 includes the generation of a predictive human interface for the various user electronic devices based upon the stored specific characteristics for all of the registered electronic user devices 405. This predictive human interface is then provided to all of the user devices 406 for subsequent display 407. The predictive human interface provides a similar user interface on all of the various electronic user devices. The predictive human interface may also present communication alternatives to the user that have been predicted based upon the stored specific characteristics associated with the user's previous communications and stored user preferences. It is further noted that the user's initially entered preferences may be changed at any time after the initialization period as well.

The presented communication alternatives may be prioritized according to the most probable user communication based upon a current date and/or a current time of day. The presented communication alternatives may also be based upon the user's current location and/or the intended communication recipient's current location. The presented communication alternatives may be visually presented to the user as icons or avatars, each visually presented icon or avatar providing a visual distinction when a person associated with the visually presented icon or avatar is currently on-line, off-line, and/or available to receive a user communication. Additionally, each visually presented icon or avatar may provide specific information regarding the amount of time that has elapsed since a last communication between the user and a person associated with the visually presented icon or avatar. Furthermore, each visually presented icon or avatar may provide specific information regarding the number of pending communications that have not been communicated to the user, from each person associated with each presented icon or avatar. The presented communication alternatives may be further prioritized according to the stored user preferences regarding how specified communications are to be processed. It is noted that the presented communications alternatives may optionally be presented audibly instead of, or in addition to, the visually presented communication alternatives.

The user may select one of the presented communication alternatives in order to initiate a new communication, wherein a particular form of communication medium is automatically selected for the new communication based on an algorithm that evaluates one, a specific combination of, or all of the stored specific characteristics. The form of evaluation performed by the algorithm may optionally be set as a preference by the user.

The presented communication alternatives may include, but is not limited to, initiating a call, browsing the internet, sending an email, initiating a conference call, sending a text message, sending a short length-limited message, watching internet protocol television, and sending an instant message.

The generated predictive human interface is constantly being regenerated and distributed to the various user electronic devices, such that the predictive human interface is constantly evolving and learning over time. The regeneration may be performed in a number of different ways, such as after each user communication, after a predetermined number of user communications, at specified time intervals, and upon a user-initiated action. These different methods of regeneration may optionally be user selectable. If a particular user electronic device is unable to receive the regenerated predictive human interface at the time of distribution, reception may optionally be temporarily delayed until such time as the particular user electronic device is able to receive the regenerated predictive human interface.

Other examples of communication alternatives that may be presented and/or used based upon the predictive human interface would include the automatic determination of a preferred communication medium based upon the detected text being entered into a user device originating a communication. Additionally, a user's audio message entered into a user device may be automatically communicated as an active phone call or as a voice note, based upon a detected or predicted availability of an intended recipient of the audio message. Furthermore, the form of communication medium and the type of communication may also be automatically presented to the user based upon a detected or predicted location or status of an intended recipient.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the interactive voice response method may be implemented using various forms of communication including telephone land lines, cell phones, voice over Internet protocol, and video calls.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission (e.g., VoIP, VoiceXML, SALT, SRGS, SISR, SSML, PLS, CCXML) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a predictive human interface for a plurality of user electronic devices:
   storing, in an electronic database, user preferences regarding how certain specified communications related to a plurality of user electronic devices are to be processed;
   monitoring and storing, by a network server, specific characteristics associated with communications originating from each of the plurality of user electronic devices;
   generating a similar predictive human interface for each of the plurality of user electronic devices, based upon the stored user preferences and the stored specific characteristics for the plurality of user electronic devices; and
   providing the similar predictive human interface to each of the plurality of user electronic devices for use during communications originating from one of the plurality of user electronic devices.

2. The method as described in claim 1,
wherein the specific characteristics include a date and time of day of each communication.

3. The method as described in claim 1,
wherein the specific characteristics include an intended destination of each communication.

4. The method as described in claim 1,
wherein the specific characteristics include a location of a user electronic device when the user electronic device originates a communication.

5. The method as described in claim 1,
wherein the specific characteristics include a location of an intended communication recipient's current location.

6. The method as described in claim 1,
wherein the similar predictive human interface is regenerated, and the similar regenerated predictive human interface is provided to the plurality of user electronic devices after a communication originating from any one of the plurality of user electronic devices.

7. The method as described in claim 1,
wherein the similar predictive human interface provides communication alternatives to a user that have been predicted based upon the stored user preferences and the stored specific characteristics associated with the user's previous communications.

8. The method as described in claim 7,
wherein the communication alternatives presented are prioritized according to a most probable user communication based upon a current date and time.

9. The method as described in claim 8,
wherein the communication alternatives presented are further prioritized according to the user's current location.

10. The method as described in claim 8,
wherein the communication alternatives are visually presented to the user as icons, each visually presented icon providing a visual distinction when a person associated with the visually presented icon is currently on-line.

11. The method as described in claim 1,
wherein the similar predictive human interface is regenerated, and the similar regenerated predictive human interface is provided to the plurality of user electronic devices immediately after a user changes a stored specific characteristic.

12. The method as described in claim 8,
wherein the communication alternatives are visually presented to the user as icons, each visually presented icon providing specific information regarding a number of pending communications that have not been communicated to the user, from each person associated with each icon.

13. The method as described in claim 8,
wherein the communication alternatives presented are further prioritized according to the stored user preferences regarding how certain specified communications are to be processed.

14. The method as described in claim 7,
wherein the user may select one of the communication alternatives in order to initiate a new communication, a communication medium being automatically selected for the new communication based on an algorithm that evaluates the stored specific characteristics, the stored specific characteristics including the frequency of particular communication mediums being previously used to communicate with an intended recipient of the new communication.

15. The method as described in claim 7, wherein the user may select one of the communication alternatives in order to initiate a new communication, a communication medium being automatically selected for the new communication based on an algorithm that evaluates the stored user preferences.

16. The method as described in claim 1, wherein the similar predictive human interface is regenerated, and the similar regenerated predictive human interface is provided to the plurality of user electronic devices at designated time intervals.

17. A tangible computer-readable storage medium, encoded with a computer-executable program for providing a predictive human interface for a plurality of user electronic devices, and that when executed by a processor, causes the processor to perform operations comprising:
 storing, in the electronic database, user preferences regarding how certain specified communications related to a plurality of user electronic devices are to be processed;
 monitoring and storing, by a core network server, specific characteristics associated with communications originating from each of the plurality of user electronic devices;
 generating a similar predictive human interface for each of the plurality of user electronic devices, based upon the stored user preferences and the stored specific characteristics for the plurality of user electronic devices; and
 providing the similar predictive human interface to each of the plurality of user electronic devices for use during communications originating from one of the plurality of user electronic devices.

18. The tangible computer-readable storage medium described in claim 17, wherein the similar predictive human interface provides communication alternatives to a user that have been predicted based upon the stored user preferences and the stored specific characteristics associated with the user's previous communications.

19. A network server for providing a predictive human interface for a plurality of user electronic devices, comprising:
 a memory including an electronic database for storing an identification of each of a received plurality of user electronic devices associated a user account;
 a processor for monitoring and storing specific characteristics associated with communications originating from each of the plurality of user electronic devices;
 a generator for generating a similar predictive human interface for each of the plurality of user electronic devices, based upon previously stored user preferences and the stored specific characteristics for the plurality of user electronic devices; and
 a transmitter for providing the similar predictive human interface to each of the plurality of user electronic devices for use during communications originating from one of the plurality of user electronic devices.

20. The network server described in claim 19, wherein the predictive human interface provides communication alternatives to a user that have been predicted based upon the stored specific characteristics associated with the user's previous communications.

* * * * *